United States Patent Office 2,917,486
Patented Dec. 15, 1959

2,917,486
STABLE INTERMEDIATE REACTION PRODUCTS

Jerry A. Nelson, Salem, N.J., and John J. Verbanc, Wilmington, Del., assignors to E. I. du Pont de Nemours & Company, Wilmington, Del., a corporation of Delaware No Drawing. Application September 9, 1953
Serial No. 379,291

13 Claims. (Cl. 260—45.9)

This invention relates to the preparation of elastomeric products formed by reactions involving organic diisocyanates and polyalkylene ether glycols or glycol-dicarboxylic acid polyesters containing terminal hydroxyl groups. More particularly it relates to the preparation of stable intermediate products from these reactions and to the subsequent conversion of the intermediates to the final elastomeric products.

The formation of useful elastomeric condensation products from the reaction of an organic diisocyanate with a high molecular weight polyalkylene ether glycol in the presence of water or other chain-extending agent containing active hydrogen atoms is described in U.S. Patents 2,692,873; 2,692,874; and copending application Serial No. 365,270, filed June 30, 1953. Other useful elastomeric products are formed when an organic diisocyanate is reacted with a high molecular weight polyester of a glycol and a dicarboxylic acid in the presence of water, as described for example by Bayer et al. in Angewandte Chemie, 62, 57–66 (1950). In each of the processes so described, the product which is first formed will ordinarily contain free isocyanate groups and must be molded and cured to its final condition without substantial delay. If the polymer is allowed to stand for only a few hours prior to molding and curing, cross-linking of the polymer chains will take place. The mass can then no longer be milled to a smooth coherent band on a rubber mill, but instead yields a rough non-homogeneous band and will not flow into the shape of the mold so as to permit curing to give a homogeneous well-defined product.

Even when there is present with the intermediate polymer an excess of some material such as water, which is capable of reaction with the free isocyanate groups, this reaction may not proceed to completion and the product may still be susceptible to premature curing and cannot safely be stored for extended periods in the uncured state.

It is an object of this invention to provide a method of stabilizing such intermediate polymers against premature setting to an unworkable state. A further object is to provide a method for subsequently converting these stabilized intermediate polymers into the final cured elastomeric product.

According to the present invention, it has been found that intermediate polymers from the reaction of an organic diisocyanate, a material having a molecular weight of at least 750 and selected from the group consisting of polyalkylene ether glycols and polyesters of glycols and dicarboxylic acids, said polyesters containing terminal hydroxyl groups, and a chain extending agent having a plurality of active hydrogen atoms, which polymers contain unreacted isocyanate groups, can be stabilized against premature curing to an unworkable state by incorporating therewith, after the polymer has reached a condition of high viscosity but while it is still workable on a rubber mill to form a smooth band, enough of a nitrogen base having a basic ionization constant of at least $1 \times 10^{-12}$ and containing a single nitrogen atom having hydrogen attached thereto, to provide at least one such nitrogen atom for each unreacted isocyanate group in the polymer. This will normally require the addition of from 0.1 to 8% by weight of the nitrogen base. Smaller amounts of low molecular weight nitrogen bases will of course be needed than in the case of higher molecular weight compounds. The intermediate polymer stabilized in this manner can be subsequently converted to the final elastomeric product by incorporating therewith from 1 to 20% by weight of an organic compound containing at least two isocyanate groups and subjecting the mixture to a temperature of from 80 to 175° C.

The intermediate polymer is ordinarily in the form of a mass of crumbs, and the stabilizer is conveniently incorporated by mixing on a rubber mill. There results a rubbery mass which, after standing for from two weeks to as long as several months, can be returned to the rubber mill and worked into a smooth band which can be compounded and cured in a mold under heat and pressure to give a tough rubber of excellent tensile strength.

This invention is illustrated by the following examples, in which parts are by weight:

Example 1

Into a Werner-Pfleiderer mill are placed 1050 parts of a polyethylene ether glycol of an average molecular weight of 1000 and the mill is heated to 80° C. There are then added 3.45 parts of water which is mixed into the glycol, after which there is added a mixture of 548 parts of 2,4-tolylene diisocyanate and 2.62 parts of benzenesulfonyl chloride. The mass is milled at an average temperature of 80° C. for one hour. At the end of this time the product is an amber syrupy mass. There are then added 8.3 parts of pyridine and 69.4 parts of water. Milling is continued until the product is transformed into a crumbly mass. During this time the reaction is exothermic and it is necessary to use cooling water on the jacket of the mill. The temperature at the crumbling stage is about 60° C.

One hundred (100) parts of the crumbs are put on a cold rubber mill and milled until there is formed a band, which requires about three minutes. There are then slowly added 2 parts of piperidine so that it is all taken up by the mass. Blending on the mill continues for 10 minutes. The product is then a smooth, homogeneous, transparent, rubbery, light amber mass. After standing for 2 months, the stabilized polymer can be readily milled on a cold mill whereas a control sample to which no piperidine has been added cannot be milled to a smooth band after 3–4 hours.

Other separate portions of the unstabilized crumbs are treated in the same way with:

4.1 parts morpholine,
  2.02 parts ethyleneimine,
  4.66 parts cyclohexylamine,
  2.6 parts dicyclohexylamine,
  3.43 parts n-butylamine,
  6.07 parts di-n-butylamine,
  6.07 parts diisobutylamine,
  2.68 parts allylamine,
  5.02 parts benzylamine, and
  5.36 parts ammonium carbonate monohydrate, respectively, per 100 parts of polymer. (The temperature of the sample treated with ammonium carbonate is above 58° C. on the mill, so that the ammonium carbonate is decomposed.) In each case, the resulting product is unchanged after several weeks' storage.

Samples of a number of the stabilized polymers and the unstabilized control are cured by compounding with the dimer of 2,4-tolylene diisocyanate on a rubber mill and then heating in a mold at 134° C. under pressure for 30 minutes. In the case of the piperidine-stabilized sample, 4 parts of dimer per 100 parts of polymer are used, while with the other samples, 8 parts of dimer are used. The products from the stabilized polymer are uniform and show good mold definition. The product from the control polymer shows poor mold definition and has imperfections in the body of the molding. Physical tests on the cured polymer samples at 25° C. in water show the following:

| Stabilizer | Tensile strength at break, p.s.i. | Modulus, 300% elongation, p.s.i. | Percent Elongation at break |
|---|---|---|---|
| piperidine | 3,580 | 1,250 | 500 |
| morpholine | 2,470 | 1,050 | 560 |
| cyclohexylamine | 3,980 | 1,390 | 600 |
| n-butylamine | 3,640 | 1,590 | 530 |
| di-n-butylamine | 4,930 | 1,340 | 600 |
| ammonium carbonate | 4,200 | 1,450 | 550 |

Example 2

Into a Werner-Pfleiderer mill are placed 1076 parts of polypropylene ether glycol (prepared from 1,2-propylene oxide) of average molecular weight of 1025, having a water content of 0.31%. The mill is heated to 80° C. and there is added a mixture of 548 parts of 2,4-tolylene diisocyanate and 2.63 parts of benzene sulfonyl chloride. The mass is then milled at an average temperature of 80° C. for 1 hour. At the end of this time the product is a syrupy homogeneous mass. There are then added 8.29 parts of pyridine and 71 parts of water. Milling is continued at 80° C. until the product becomes a crumbly mass. One hundred (100) parts of polymer crumbs are put on a cold rubber mill and milled until it forms a band, in about 3 minutes. There are then slowly added 4 parts of piperidine. The mass is blended on the mill for 10 minutes and yields a smooth homogeneous transparent rubbery mass. After 6 weeks' storage the product is unchanged.

When 100 parts of the stabilized polymer are compounded on a rubber mill with 4 parts of the dimer of 2,4-tolylene diisocyanate and cured at 134° C. under pressure for 30 minutes, the resulting rubber has the following properties:

Tensile strength at the break ---------- p.s.i.-- 2410
Elongation at the break ---------- percent-- 330
Modulus at 300% elongation ---------- p.s.i.-- 2190

A control sample to which no piperidine is added can not be milled to a smooth sheet after standing for 3 to 4 days.

Example 3

Into a Werner-Pfleiderer mill are placed 105 parts of polyethylene ether glycol having an average molecular weight of 1000. The mill is heated to 80° C. and 0.345 part of water is added and milled in. A mixture of 54.8 parts of 2,4-tolylene diisocyanate and 0.262 part of benzene sulfonyl chloride is added and the mass milled at 80°–100° C. for one hour. To the resulting syrupy mass are added 0.83 part of pyridine and 6.94 parts of water. The mixture evolves carbon dioxide and becomes viscous. The mass gradually becomes taffy-like with a silvery sheen and begins to pull away from the sides of the mill. At this point, 0.83 part of piperidine is added. In a short time, amber transparent patches appear in the taffy-like mass and the mass pulls away from the mill. In a few minutes the polymer changes to a crumb. The polymer crumb is then milled on a rubber mill at 60° C. for about 10 minutes. A homogeneous mass is obtained which remains unchanged after several weeks' storage.

Use of the same procedure except for the substitution of 3.2 parts of aniline for the 0.83 part of piperidine yields a similar homogeneous mass which also remains stable after several weeks' storage.

One hundred (100) parts of the polymer stabilized with piperidine are compounded on a rubber mill with 8 parts of the dimer of 2,4-tolylene diisocyanate and cured at 134° C. under pressure for 30 minutes. The resulting rubber has the following properties:

Tensile strength at the break ---------- p.s.i.-- 3010
Elongation at the break ---------- percent-- 500
Modulus at 300% elongation ---------- p.s.i.-- 1620

Example 4

Into a flask are placed 1875 parts of adipic acid. The acid is melted and a stream of nitrogen is passed through slowly. A mixture of 700 parts of ethylene glycol and 300 parts of propylene glycol is added at a uniform rate over a period of 48 hours, while the temperature is maintained at 165° C. After the addition of the mixed glycols is completed, the mixture is maintained at 165° C. overnight, during which time water distills off. The temperature is then increased to 220° C., the pressure is reduced to 5 mm., and the mixture is maintained at this temperature for 8 hours. During this time, excess glycol and water are removed. Approximately 1800 parts of polyester are obtained, which has the following analysis:

Acid number ---------------------------- 3.5
Hydroxyl number ------------------------ 32.8
Water ---------------------------- percent-- 0.29

To a mixture of 300 parts of the molten polyester are added 62.6 parts of 2,4-tolylene diisocyanate and 0.35 part of benzene sulfonyl chloride. This mixture is maintained at a temperature of 80° C. for 15 minutes. Then 0.25 part of triethylamine and 6 parts of water are added. The mixture is vigorously stirred and poured into a pan and baked in an oven at 120° C. for 8 hours. A straw-colored, spongy mass is obtained.

Thirty (30) parts of the spongy polymer are milled on a rubber mill for 3 minutes at approximately 40° C. Then 0.20 part of allylamine is added and the mixture is milled and blended for 12 minutes at approximately 40° C. After this milling procedure, the polymer is removed from the mill and is light, straw-colored and very soft. It bands very readily and gives a smooth, glossy band. After storage for 7 days at room temperature, the properties of the polymer have not changed. It shows the same behavior on the rubber mill as it did originally. There is no significant difference in the power consumption on the mill before and after the seven-day storage.

To 10 parts of the stabilized polymer on a rubber mill is added 0.8 part of the dimer of 2,4-tolylene diisocyanate. During the milling the temperature is not allowed to exceed 40° C. The compounded polymer is cured for 1 hour at 134° C. under pressure. The cured specimen is a transparent, straw-colored, rubbery ring, having a modulus at 300% elongation of 770 p.s.i., a tensile strength at the break of 2270 p.s.i., and elongation at the break of 580%.

A control sample of the polymer which is not treated with allylamine does not band out on the mill after standing for a week.

Example 5

Separate samples of the polyester-diisocyanate elastomer prepared as in Example 4 are stabilized with the agents shown in the following table. In each case, 30 parts of the elastomer are milled in a cold rubber mill for 3 minutes to give a band, the stabilizing agent is added and milling is continued for 12 minutes to give a smooth glossy band. After storage for 7 days, the stabilized polymer is cured as in Example 4. The properties of the cured rubbers are shown in the table below. In all cases, the behavior of the stabilized elastomers on the rubber mill before curing is excellent. There is no significant difference in power consumption before and after the storage period.

| Additive | Parts | Cured Elastomer | | |
|---|---|---|---|---|
| | | Tensile strength at the break in p.s.i. | Modulus at 300% elongation in p.s.i. | Elongation at the break, percent |
| Ammonium Carbonate.H₂O | 0.20 | 2,500 | 710 | 600 |
| Aniline | 0.33 | 1,930 | 710 | 580 |
| Benzylamine | 0.38 | 2,050 | 710 | 590 |
| n-Butylamine | 0.26 | 2,240 | 740 | 570 |
| Cyclohexylamine | 0.35 | 2,270 | 820 | 540 |
| Di-n-butyl-amine | 0.45 | 2,240 | 650 | 560 |
| Morpholine | 0.31 | 2,470 | 680 | 600 |
| N-Methylaniline | 0.38 | 1,730 | 600 | 580 |
| Piperidine | 0.30 | 2,020 | 740 | 510 |

Example 6

One hundred (100) parts of the polyester as prepared in Example 4 are melted in a Werner-Pfleiderer mixer preheated to 100–115° C. To this are added 20.88 parts of 2,4-tolylene diisocyanate and 0.2 part of benzene sulfonyl chloride. The mass is milled for 15 to 20 minutes at 100–115° C. Then 0.25 part of triethylamine and 2.0 parts of water are added and milling is continued at this temperature for 2 hours. At the end of this time the mass begins to pull away from the sides of the mixer. There is then added 0.60 part of piperidine. Cooling water is turned on the mixer. Mixing is continued for 15 minutes. The mass is then milled to a smooth band on a rubber mill. After storage for 7 days there is no change in its behavior on the rubber mill.

Ten (10) parts of the stabilized elastomer are milled on a rubber mill to form a smooth band and 0.4 part of the dimer of 2,4-tolylene diisocyanate is added. After compounding on a cold mill, the mass is cured at 134° C. for 30 minutes under pressure. The cured elastomer has the following properties:

Tensile strength at the break _____p.s.i.__ 3120
Modulus at 300% elongation _____p.s.i.__ 990
Elongation at the break _____percent__ 480

Example 7

Into a Werner-Pfleiderer mill are placed 555 parts of a polytetramethylene ether glycol (polybutylene ether glycol) of an average molecular weight of 3700 and having a water content of 0.4%. The mill is then heated to 80° C. There are then added 74 parts of 2,4-tolylene diisocyanate and the mass is milled at an average temperature of 80° C. for one hour. At the end of this time the product is an amber syrupy mass. To this are added 5 parts of water and milling is continued for 30 minutes at an average temperature of 80° C. The temperature is then raised to 100° C. and milling continues for 10 minutes. The temperature of the mill is then increased to 120° C. and milling continues for 35 minutes. At the end of this time the product is removed from the mixer as rubbery chunks which possess a slight tackiness.

One hundred (100) parts of the product are put on a cold rubber mill and milled until a band is formed, which requires about one minute. There is then added 1 part of piperidine slowly so that it is all taken up by the mass. The mixture is blended on the mill for 10 minutes. It is then a smooth, homogeneous, transparent, rubbery, light amber mass. After standing for 1 month the stabilized polymer can be readily milled on a cold mill whereas a control sample to which no piperidine has been added cannot be milled to a smooth band after 24 hours.

A sample of the stabilized polymer is cured by compounding on a rubber mill with 4 parts of the dimer of 2,4-tolylene diisocyanate per 100 parts of polymer, and then heating in a mold at 134° C. under pressure for 1 hour. Physical tests at 25° C. in water show the following:

Tensile strength at the break _____p.s.i.__ 4930
Modulus at 300% elongation _____p.s.i.__ 620
Elongation at the break _____percent__ 690

Example 8

One molar part of a polytetramethylene ether glycol having an average molecular weight of 2150 and containing 0.06% water is mixed with 2.3 molar parts of 2,4-tolylene diisocyanate in a W–P mixer at 115° C. for about two hours under an atmosphere of nitrogen. There are then added 1.42 molar parts of succinic acid and heating and mixing are continued until the polymer forms a crumbly, rubbery mass or pulls away from the mill. The polymer is removed from the mixer and milled on a rubber mill to form a smooth band. There is added on the rubber mill 0.75% by weight of piperidine to act as a stabilizer. To a portion is added 8% by weight of the dimer of 2,4-tolylene diisocyanate as the curing agent. The compounded polymer is cured by putting it in a mold having a slab form and heating under pressure to about 134° C. for 60 minutes.

Other polymers are prepared using the same procedure but substituting various other chain extending agents for the succinic acid and varying the time of milling and the curing agents as indicated in the following table.

| | Chain extender | Molar parts of extender | Mixing time after extender addition, hours | Cure | |
|---|---|---|---|---|---|
| | | | | Agent | Pts./100 pts. polymer |
| A | succinic acid | 1.42 | 3.5 | dimer [2] | [3] 8 |
| B | dithiooxamide | 1.0 | 3.0 | ___do___ | 8 |
| C | 1,3-propane disulfonamide.[1] | 1.4 | 20 | ___do___ | 8 |
| D | 1,2-ethanedithiol | 1.0 | 10 | MgO dimer | 5 8 |
| E | 4-(beta-hydroxyethoxy) phenol. | 1.3 | 18 | ___do___ | 8 |
| F | beta-hydromuconic acid. | 1.16 | 11.5 | ___do___ | 8 |
| | | | | MgO | 5 |

[1] 1.4% by weight pyridine added during the mixing step, as a reaction catalyst.
[2] Dimer of 2,4-tolylene diisocyanate.
[3] Cured 60 minutes at 134° C.; all others cured 30 minutes.

These products display the following properties when tested at 25° C.:

| | Tensile strength, lbs./sq. in. | Modulus at 300% elongation, lbs./sq. in. | Elongation at break, percent |
|---|---|---|---|
| A | 1,263 | 632 | 520 |
| B | 1,420 | 842 | 440 |
| C | 1,730 | | 280 |
| D | 1,740 | | 560 |
| E | 1,240 | 631 | 400 |
| F | 1,520 | 848 | 360 |
| | | 1,160 | |

Example 9

A mixture of 1 molar part of a polytetramethylene ether glycol having an average molecular weight of 2670, an acid number of 1.35, and containing 0.033% water with 2.3 molar parts of 2,4-tolylene diisocyanate is heated in a Werner-Pfleiderer mixer at 100° C. for about two hours under an atmosphere of nitrogen. There is then added 0.965 molar part of ethylene glycol and the mass is heated and mixed for one hour at 100° C. and for an additional two hours at 120° C. The mass is removed from the mixer and sheeted out on a rubber mill. To stabilize the product against premature curing, 0.5% of piperidine, based on the weight of polymer, is added during the milling.

One hundred (100) parts by weight of the stabilized polymer are sheeted out on a cold rubber mill and 8 parts of the dimer of 2,4-tolylene diisocyanate are thoroughly milled in. A portion of the compounded polymer is placed in a mold and cured in a press at 105° C. for two hours. The cured elastomer, when tested at 25° C. in water, has a tensile strength of 4340 lbs. per sq. in., a modulus at 300% elongation of 625 lbs. per sq. in., and an elongation at the break of 620%.

Example 10

One hundred forty-six (146) parts of polytetramethylene ether glycol having a molecular weight of 3400 and 0.65 part of water are mixed at room temperature for 30 minutes in a Werner-Pfleiderer mixer. There are then added 16.5 parts of hexamethylene diisocyanate and mixing is continued for one hour at room temperature, one hour at 50° C., two hours at 100° C., and one hour at 115° C. The polymer thus formed is cooled to room temperature and divided into two parts. One 100 part portion is milled on a rubber mill at room temperature to form a band and 1.5 parts of piperidine are thoroughly milled in as a stabilizer.

A 10 part portion of the unstabilized polymer and a similar portion of the stabilized product are banded on a rubber mill at room temperature, and to each is added 1 part of the dimer of 2,4-tolylene diisocyanate. The dimer is thoroughly incorporated. The products are put into molds and are cured by heating at 132° C. for 1 hour. ASTM dumbbells cut from the resulting slabs are tested in air at 25° C. They have the following properties:

|  | Unstabilized | Stabilized |
| --- | --- | --- |
| Tensile strength at the break, p.s.i. | 1,470 | 3,310 |
| Modulus at 300% elongation, p.s.i. | 1,320 | 1,440 |
| Elongation at the break, percent | 310 | 450 |

Example 11

Twelve hundred (1200) parts (0.404 mol) of polytetramethylene ether glycol having a molecular weight of 2980, an acid number of 0.76 and containing 2.76 parts (0.153 mol) of water are placed in a W-P mixer and heated to 40-45° C. There are added 147.3 parts (0.845 mol) of 2,4-tolylene diisocyanate, the mixer jacket temperature is set at 100° and the reaction mass is milled for 2 hours. The charge is cooled to 75° and 7.92 parts (0.44 mol) of water are added. The jacket temperature is set at 100-105° and the charge milled until the polymer just begins to break away from the mixer blades. The isocyanate content of this raw polymer is 0.31% (corresponding to 0.10 equivalents of —NCO) by analysis. Stabilization is effected by adding 4.58 parts (0.10 mol) of dimethylamine over a period of 5 minutes while continuing the mixing. The gaseous amine reacts rapidly with the polymer. The stabilized polymer is then removed from the mixer and sheeted out on a cold rubber mill. Its isocyanate content after stabilization is 0.05% (0.016 eq. —NCO) by analysis and the product is stable, being readily millable after several weeks' storage.

Example 12

The polymer is prepared as described in Example 11, except that it is removed from the W-P mixer after it has separated from the blades. Analysis for isocyanate shows 0.30% (0.10 eq.) of —NCO. The charge is transferred to a rubber mill and stabilized by milling in 9.3 parts (0.10 mol) of aniline. It is then sheeted from the mill. The stabilized polymer contains 0.08% (0.02 eq.) —NCO, and is stable to storage for several weeks.

Example 13

A charge of 1312 parts (0.43 mol) of polytetramethylene ether glycol having a molecular weight of 3050, an acid number of 0.8 and containing 1.52 parts (0.085 mol) of water are placed in a W-P mixer and heated to 70°. 172.1 parts (0.989 mol) of 2,4-tolylene diisocyanate are added, and the charge milled for 2 hours at 80-85°. The temperature is then reduced to 70° over a one-half hour period. 12.94 parts (0.718 mol) of water are added and the charge milled for one-half hour at 70°. The reaction temperature is increased from 70° to 85° over the next one-half hour and then to 105-110° during the next 10-20 minutes. When the mixer power requirement reaches 0.11 kw./pound of charge, the ram is put in and the charge milled for 10 minutes. The polymer is removed from the mixer. Its —NCO content is 0.10%, corresponding to 0.035 equivalents. It is stabilized on a rubber mill by milling in 3.4 parts (0.040 mol) of piperidine. The stabilized polymer contains 0.006 equivalent of —NCO and is stable to storage for a period of at least three weeks.

Example 14

One hundred thirty-five (135) parts of polytetramethylene ether glycol having an average molecular weight of 2740 are mixed with 1.245 parts of water in a Werner-Pfleiderer mixer at room temperature for 15 minutes. 20.8 parts of 2,4-tolylene diisocyanate are then added, and mixing is continued while the temperature is raised to 90° C. over a period of 30 minutes, held there for 30 minutes, raised to 120° C. during 30 minutes, held at approximately 120° C. for 55 minutes, and finally raised to 140° C. and mixed at that temperature for 40 minutes. The polymer is removed from the mixer. Analysis shows an isocyanate content of 18.4 milliequivalents of —NCO per 100 grams of polymer.

One hundred (100) parts of the polymer are then milled on a rubber mill to a smooth band while 4.5 parts of o-chloroaniline (35.3 milliequivalents) are added. The polymer is stabilized against precuring on standing as shown by the fact that after 25 days it can be sheeted out to a smooth band on a rubber mill, while a control sample not treated with o-chloroaniline will not mill at all but breaks into crumbs which fall off the mill.

The organic diisocyanate/polyalkylene ether glycol polymers to which this invention is applicable are those described and claimed in copending application Serial No. 365,270, filed June 30, 1953. As there defined, the term "polyalkylene ether glycols" refers to polyethers which contain terminal hydroxy groups and which are ordinarily derived from glycols or from cyclic ethers such as alkylene oxides or dioxolane. They are sometimes known as polyalkylene glycols or polyalkylene oxide glycols. They may be represented by the formula $HO(RO)_nH$, in which R stands for an alkylene radical and $n$ is an integer greater than one. In the polyethers useful in this invention, $n$ is sufficiently large that the polyalkylene ether glycol has a molecular weight of at least 750. Polyalkylene ether glycols containing a mixture of alkylene radicals may be used. The molecular weights of the glycols which are useful are at least 750 and may be as high as 10,000. Polytetramethylene ether glycol, also known as polybutylene ether glycol, polypropylene ether glycol (the name commonly given to the polymer obtained from 1,2-propylene oxide) and polyethylene ether glycol are the preferred glycols.

The process of this invention is also applicable in the preparation of elastomeric condensation products from the reaction of organic diisocyanates with polyesters and chain-extending agents. Products of this type are described in Rubber Chemistry and Technology 23, 812-35 (1950) and also in U.S. Patents Nos. 2,621,166, 2,625,531 and 2,625,532. The polyesters must have molecular weights of at least 750 and are prepared by reacting together glycols such as ethylene glycol, 1,2-propylene glycol, 2,3-butylene glycol, and 1,6-hexylene glycol, and dicarboxylic acids such as adipic, pimelic, sebacic, oxalic and phthalic acids and decamethylene dicarboxylic acid. The polyester resulting from reaction of adipic acid with a mixture of ethylene and propylene glycols is preferred.

In the preparation of these polyesters, the glycol is used in at least slight excess so that the polyesters contain terminal hydroxyl groups which are available for reaction with the isocyanates.

In the reaction with either polyethers or polyesters, any of a wide variety of organic diisocyanates may be used. Representative compounds include 2,4-tolylene diisocyanate, m-phenylene diisocyanate, 4-chloro-1,3-phenylene diisocyanate, 4,4′-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4′-methylene-bis-(cyclohexyl isocyanate) and 1,5-tetrahydronaphthylene diisocyanate. Arylene diisocyanates are preferred. Dimers of the monomeric diisocyanates may be used in place of the monomers.

The chain-extending agents used in the preparation of the elastomers are compounds containing a plurality of active hydrogen atoms, no more than two atoms in the molecule having active hydrogen attached thereto. The term "active hydrogen atoms" refers to hydrogens which display activity according to the Zerewitinoff test as described by Kohler in J. Am. Chem. Soc. 49, 3181 (1927). Suitable compounds include water, hydrogen sulfide, ethylene glycol, adipic acid, adipamide, 1,2-ethanedithiol, hydroquinone, monoethanolamine, ethylenediamine, and 4-hydroxybenzoic acid.

Any nitrogen base which has a basic ionization constant, $K_b$, at 25° C. of at least $1 \times 10^{-12}$ and which contains a single nitrogen atom having hydrogen attached thereto is useful as a stabilizing agent in the process of this invention. Operable compounds include ammonia and salts such as ammonium carbonate hydrate which decompose under reaction conditions to yield ammonia, mono- or diethylamine, n-butylamine, di-n-butylamine, diisobutylamine, allylamine, aniline, benzylamine, N-methyl aniline, cyclohexylamine, dicyclohexylamine, piperidine, morpholine and ethyleneimine. Other substituents may be present on the hydrocarbon portion of the molecule. The ionization constants of some of these compounds are as follows:

| Compound: | Basic ionization constant ($K_b$) |
|---|---|
| Piperidine | $1.6 \times 10^{-3}$ |
| Diethylamine | $1.3 \times 10^{-3}$ |
| Ethylamine | $5.6 \times 10^{-4}$ |
| Dimethylamine | $5.2 \times 10^{-4}$ |
| n-Butylamine | $4.1 \times 10^{-4}$ |
| Ammonia | $1.8 \times 10^{-5}$ |
| p-Toluidine | $2 \times 10^{-10}$ |
| Aniline | $4 \times 10^{-10}$ |
| o-Toluidine | $4 \times 10^{-10}$ |
| p-Chloroaniline | $3 \times 10^{-11}$ |
| o-Chloroaniline | $1 \times 10^{-12}$ |

Diphenylamine has an ionization constant of $4 \times 10^{-13}$ and is not a satisfactory stabilizing agent.

The behavior of the compounds of this invention in stabilizing the reaction against premature setting of the elastomer is in striking contrast to the behavior of tertiary amines which actually catalyze the reaction between isocyanate groups and compounds containing active hydrogen. In general, it is believed that the hydrogen atoms attached to the nitrogen bases of this invention react more rapidly with isocyanate groups than do those present in hydroxyl, carboxyl, sulfhydryl groups and the like.

In order to produce stabilization, it is desirable to add enough of the nitrogen base to provide at least one nitrogen atom having hydrogen attached thereto for each unreacted or free isocyanate radical in the polymer. The number of unreacted isocyanate groups or the —NCO equivalent may be readily ascertained by analysis, and consequently the necessary minimum quantity of stabilizer may be readily calculated. Not more than four equivalents of nitrogen base per equivalent of —NCO should be added, since amounts greater than this have a generally adverse effect on the properties of the elastomer. In the case of the stronger nitrogen bases having ionization constants greater than about $1 \times 10^{-10}$, only a slight excess of the nitrogen base over the theoretical amount equivalent to the unreacted isocyanate group content of the polymer is necessary to obtain essentially complete elimination of free —NCO groups. With nitrogen bases having ionization constants between $1 \times 10^{-10}$ and $1 \times 10^{-12}$, up to a 400% excess of theory may be necessary to achieve the desired degree of stabilization. From an empirical standpoint, the desired degree of stabilization may ordinarily be obtained by the incorporation of from 0.1 to 8.0% of the nitrogen base, calculated on the weight of the polymer.

The preparation of a polymer by a given procedure and using definite proportions of ingredients results in a reasonably definite and consistent amount of residual —NCO in the polymer. Once this amount is known, similar preparations may be made and stabilized on the same basis without resorting to individual analyses.

The amount of unreacted isocyanate in a polymer may be determined by the following analytical procedure:

Weigh into 250 cc. Erlenmeyer flasks two approximately 1-gram samples of the polymer accurate to 0.001 g. To each sample add 50 cc. of tetrahydrofuran (THF) and exactly 25 cc. of a standard 0.1 N solution of n-butylamine in THF. (The THF used in this procedure is dried and distilled over sodium.) The flasks are tightly stoppered with aluminum covered corks and allowed to stand overnight. During this time the polymer becomes highly swollen and in some cases dissolves. If the polymer has not dissolved add 5 cc. of water to the sample, place the flask on the shaker and shake for 2 hours. The excess butylamine is then titrated with 0.1 N HCl using 6 to 8 drops of 0.1% bromphenol blue as the indicator. The percent NCO is calculated by the formula:

$$\text{Percent NCO} = \frac{(25 \times N.\text{BuNH}_2 - \text{cc. HCl} \times N.\text{HCl}) \times 42}{\text{Sample weight} \times 1000} \times 100$$

In the usual way of preparing the stabilized polymer, the polyether or polyester is milled with an organic diisocyanate in a suitable mill, such as a Werner-Pfleiderer mixer, and then the chain-extending agent is added, together with any additives which are to be used, such as a tertiary nitrogen base catalyst. As the molecular weight increases the mixture becomes more and more viscous and turns to a mass of crumbs. These crumbs are then transferred to a rubber mill and milled to a sheet or continuous band, whereupon the nitrogen base stabilizer is added and the mix blended on the mill. The nitrogen base is also effective when added during the final stages of the polymerization in the Werner-Pfleiderer mixer just before the mass begins to pull away from the mill and form crumbs.

When it is desired to convert the stabilized intermediate polymer into the final elastomeric product, from 1 to 20% by weight of an organic polyisocyanate, based on the weight of polymer, is incorporated by blending on a rubber mill and the resulting rubbery mass is then put in suitable molds and cured by the application of heat and, ordinarily, of pressure. Any of the diisocyanates previously mentioned are suitable for use as curing agents. Diisocyanate dimers and such compounds as di(3-isocyanato-4-methylphenyl) urea are particularly convenient curing agents. During the blending step, the rubber mill may be cold or may be warmed to any desired temperature up to about 70° C. The temperatures and pressures normally used in rubber manufacture may be employed in the curing mold. Pressures of 150 to 4000 pounds per square inch and temperatures from 80 to 175° are suitable.

It is possible to obtain cured products without resorting to the heat and pressure of a mold. The compounded material may be permitted to stand at room temperature until cured. This usually requires several days. Thus thin sheets may be formed on the rolls or a mill and removed as unsupported films or calendered onto supporting surfaces. These products will slowly cure at room temperature.

The process of this invention makes it possible to prepare a stable intermediate polymer which can be stored for extended periods of time and which can then be compounded and molded as needed. It also permits the preparation of large batches of the intermediate from which a variety of final products may be made by the use of different compounding agents and additives, such as carbon black, chalk and so on. The intermediate polymer may be prepared at one location and then shipped to other places for finishing. Polymers stabilized according to this invention also display improved millability, as there is no tendency for further condensation or thickening to take place during the milling step. This results in the generation of less heat during milling and a lower power consumption.

This application is a continuation-in-part of copending application Serial No. 305,912, filed August 22, 1952, now abandoned.

What is claimed is:

1. In the preparation of elastomeric polymeric products from the reaction of an organic diisocyanate, a material having a molecular weight of at least 750 and selected from the group consisting of polyalkyleneether glycols and polyester glycols prepared from glycols and dicarboxylic acids, and a chain-extending agent having a plurality of active hydrogen atoms which are reactive with an isocyanate group, there being no more than two atoms in said chain-extending agent having active hydrogen attached thereto, said chain-extending agent being selected from the group consisting of water, hydrogen sulfide and organic compounds containing two active hydrogen-containing groups in the molecule; the process of stabilizing an uncured polymer from said reaction against premature curing, said uncured polymer containing unreacted isocyanate groups, which comprises incorporating with said uncured polymer after it has reached a condition of high viscosity but while it is still workable on a rubber mill to form a smooth band, enough of a nitrogen base having a basic ionization constant of at least $1 \times 10^{-12}$ and containing a single nitrogen atom having hydrogen attached thereto, to provide at least one such nitrogen atom for each unreacted isocyanate group in said uncured polymer, said nitrogen atom being the sole atom in said nitrogen base having hydrogen attached thereto which is reactable with an isocyanate group.

2. A process according to claim 1 in which the elastomeric polymeric product is formed from the reaction of an organic diisocyanate, a polyalkyleneether glycol having a molecular weight greater than 750 and a chain-extending agent having a plurality of active hydrogen atoms which are reactive with an isocyanate group there being no more than two atoms in said chain-extending agent having active hydrogen attached thereto, said chain-extending agent being selected from the group consisting of water, hydrogen sulfide and organic compounds containing two active hydrogen-containing groups in the molecule.

3. A process according to claim 2 in which the organic diisocyanate is an arylene diisocyanate.

4. A process according to claim 3 in which the polyalkyleneether glycol is a polytetramethyleneether glycol.

5. A process according to claim 4, in which the arylene diisocyanate is 2,4-tolylene diisocyanate.

6. A process according to claim 5 in which the chain-extending agent is water, and the nitrogen base is piperidine.

7. A process according to claim 5 in which the chain-extending agent is water and the nitrogen base is di-n-butylamine.

8. A process according to claim 1 in which the elastomeric polymeric product is formed from the reaction of an arylene diisocyanate, a polyester glycol prepared by reacting adipic acid with a mixture of ethylene glycol and propylene glycol, said polyester having a molecular weight of at least 750, and a chain-extending agent having a plurality of active hydrogen atoms which are reactive with an isocyanate group there being no more than two atoms in said chain-extending agent having active hydrogen attached thereto, said chain-extending agent being selected from the group consisting of water, hydrogen sulfide and organic compounds containing two active hydrogen-containing groups in the molecule.

9. A process according to claim 8 in which the chain-extending agent is water.

10. A process of preparing elastomeric polymeric products which comprises reacting (1) an organic diisocyanate, (2) a material having a molecular weight of at least 750 and selected from the group consisting of polyalkyleneether glycols and polyester glycols prepared from glycols and dicarboxylic acids, and (3) a chain-extending agent having a plurality of active hydrogen atoms which are reactive with an isocyanate group there being no more than two atoms in said chain-extending agent having active hydrogen attached thereto, said chain-extending agent being selected from the group consisting of water, hydrogen sulfide and organic compounds containing two active hydrogen-containing groups in the molecule, so as to form a millable reaction mixture containing unreacted isocyanate groups and which is capable of being worked on a rubber mill to form a smooth band; incorporating with said millable reaction mixture enough of a nitrogen base having a basic ionization constant of at least $1 \times 10^{-12}$ and containing a single nitrogen atom having hydrogen attached thereto to provide at least one such nitrogen atom for each unreacted isocyanate group in said reaction mixture so as to stabilize said reaction mixture and prevent premature setting, said nitrogen atom being the sole atom in said nitrogen base having hydrogen attached thereto which is reactable with an isocyanate group; and thereafter curing said stabilized reaction mixture by incorporating therewith from 1–20% by weight, based on the weight of said stabilized reaction mixture, of an organic compound containing at least two isocyanate groups, and subjecting the mixture to a temperature between 80 and 175° C.

11. A stable polymeric product, having a high viscosity but capable of being worked on a rubber mill to form a smooth band, obtained by the reaction of (1) an organic diisocyanate, (2) a material having a molecular weight of at least 750 selected from the group consisting of polyalkylene-ether glycols and polyester glycols prepared from glycols and dicarboxylic acids and (3) a chain-extending agent having a plurality of active hydrogen atoms which are reactive with an isocyanate group there being no more than two atoms in said chain-extending agent having active hydrogen attached thereto, said chain-extending agent being selected from the group consisting of water, hydrogen sulfide and organic compounds containing two active hydrogen-containing groups in the molecule; said polymeric product being stabilized against premature setting to an unworkable state by the incorporation therewith of enough of a nitrogen base having a basic ionization constant of at least $1 \times 10^{-12}$ and containing a single nitrogen atom having hydrogen attached thereto, to provide at least one such nitrogen atom for each unreacted isocyanate group present in said polymeric product prior to stabilization, said nitrogen atom being the sole atom in said nitrogen base having hydrogen attached thereto which is reactable with an isocyanate group.

12. A stable polymeric product, having a high viscosity but capable of being worked on a rubber mill to form a smooth band, obtained by the reaction of an organic diisocyanate, a polyalkyleneether glycol having a molecular weight of at least 750, and a chain-extending agent having a plurality of active hydrogen atoms which are reactive with an isocyanate group there being no more than two atoms in said chain-extending agent having active hydrogen attached thereto, said chain-extending agent being selected from the group consisting of water, hydrogen sulfide and organic compounds containing two active hydrogen-containing groups in the molecule, said polymeric product being stabilized against premature setting to an unworkable state by the incorporation therewith of enough of a nitrogen base having a basic ionization constant of at least $1 \times 10^{-12}$ and containing a single nitrogen atom having hydrogen attached thereto, to provide at least one such nitrogen atom for each unreacted isocyanate group present in said polymeric product prior to stabilization, said nitrogen atom being the sole atom in said nitrogen base having hydrogen attached thereto which is reactable with an isocyanate group.

13. The stable polymeric product of claim 12 in which the organic diisocyanate is 2,4-tolylene diisocyanate, the polyalkyleneether glycol is a polytetramethyleneether glycol, the chain-extending agent is water, and the nitrogen base is piperidine.

References Cited in the file of this patent

UNITED STATES PATENTS

| | | |
|---|---|---|
| 2,621,166 | Schmidt et al. | Dec. 9, 1952 |
| 2,625,531 | Seeger | Jan. 13, 1953 |
| 2,625,532 | Seeger | Jan. 13, 1953 |
| 2,653,144 | Wielicki | Sept. 22, 1953 |

FOREIGN PATENTS

| | | |
|---|---|---|
| 150,416 | Australia | May 3, 1951 |